United States Patent [19]

Wilkerson et al.

[11] 3,891,163

[45] June 24, 1975

[54] CIRCULATION CONTROL AIRFOIL

[75] Inventors: Joseph B. Wilkerson, Damascus; Drew W. Linck, Gaithersburg, both of Md.

[73] Assignee: The United States of America as represented by the Secretary of the Navy, Washington, D.C.

[22] Filed: Apr. 11, 1974

[21] Appl. No.: 460,004

[52] U.S. Cl. .................... 244/42 CD; 416/90 A
[51] Int. Cl. ................................. B64c 3/50
[58] Field of Search ......... 244/42 CD, 42 CC, 42 R; 416/90 A, 98

[56] References Cited
UNITED STATES PATENTS 2,476,002   7/1949   Stalker ..................... 416/90 A X
2,556,710   6/1951   Stalker ..................... 416/98 UX
3,554,664   1/1971   Cheeseman et al. ........... 416/90 A Primary Examiner—Trygve M. Blix
Assistant Examiner—Paul E. Sauberer
Attorney, Agent, or Firm—R. S. Sciascia; Q. E. Hodges

[57] ABSTRACT

A main structural spar for a circulation control airfoil with a slot blade attached to the spar and a Coanda surface below the blade. Longitudinally spaced ribs attached to the slot blade and a portion of the trailing edge (or leading edge for leading edge blowing) maintain the geometric rigidity of the trailing edge (or leading edge) and maintain the slot height. The spar may have a rectangular cross section with an internal passageway along the length thereof and may also be provided with apertures so that it serves as a plenum and a plenum passage.

1 Claim, 5 Drawing Figures

PATENTED JUN 24 1975 3,891,163

SHEET 1

CIRCULATION CONTROL AIRFOIL

The invention described herein may be manufactured and used by or for the government of the United States of America for governmental purposes without the payment of any royalties thereon or therefor.

BACKGROUND OF THE INVENTION

Many different processes and materials are used to build aerodynamic structures such as wings, rotor blades, propellers etc. However, most airfoils are of similar shape (rounded leading edge and sharp trailing edge), and use only the external geometry of the airfoil to create the pressure distribution to provide lift. Conventional airfoil structural methods usually result in the center of gravity of the airfoil being at the one-quarter chord (25% c) location. The primary reason for this is because the pitching moments are generally independent of the angle of attack about the one-quarter chord location.

Since the moments and forces generally occur about the one-quarter chord location on conventional airfoils, they have been generally constructed with a "C" or "D" shaped spar for structural purposes and for purposes of providing a light weight, non-structural trailing edge. The trailing edge is generally of honey-comb or foam or some other light weight construction primarily to support the skin and maintain the external geometry of the airfoil.

SUMMARY OF THE INVENTION

Circulation control airfoils are generally symmetrical in shape (blunt leading and trailing edge) and require internal ducting leading to a jet nozzle which ejects air out along the external surface of the airfoil, thus influencing the pressure distribution on the airfoil. Blunt trailing edge (or leading edge) is defined herein as a contoured surface design which permits the air ejected from a circulation control blowing jet to remain attached to the contoured surface and to the airfoil surface opposite the blowing jet at least at zero freestream velocity. With this type of airfoil design, there is no point where the pitching moments are independent of the angle of attack as in conventional airfoil designs. The present invention minimizes the pitching moments on a circulation control airfoil by locating the center of gravity of the airfoil closer to the center of the chord line 50% chord location.

The need for a jet exit near the trailing edge of a circulation control airfoil prohibits the use of conventional airfoil designs. The trailing edge section of a circulation control airfoil cannot be filled because the air is required to pass through the internal area of the airfoil, out a slot in the upper surface of the trailing edge, and into the boundary layer of the airfoil. Air must be ducted down the structure utilizing as much of the cross-sectional area as possible in order to keep longitudinal air velocities (and thus pressure losses) as low as possible. A structural scheme is required which maintains the external airfoil geometry under all expected loading conditions. A nozzle needs to be formed which ejects air tangentially to the airfoil's trailing edge (and/or leading edge). The nozzle geometry and slot height must also be maintained under all loads and pressures. The present invention solves the foregoing circulation control airfoil design problems by providing a spar which is torsionally strong and a rib structure which maintains the geometric rigidity of the trailing edge (or leading edge) and also maintains the slot height.

STATEMENT OF THE OBJECTS OF THE INVENTION

Accordingly, it is an object of the present invention to provide a circulation control airfoil design including a main spar which is torsionally strong enough to permit holes or slots to be formed therein for the purpose of providing a plenum and a plenum passage.

It is a further object of the present invention to provide a circulation control airfoil in which the main structural spar is located near the one-half chord location.

It is a further object of the present invention to provide a supporting rib structure for maintaining the external geometry of the circulation control airfoil and for maintaining and, if necessary, adjusting slot height of the circulation control airfoil blowing slot.

Other objects, advantages and novel features of the invention will become apparent from the following detailed description of the invention when considered in conjunction with the accompanying drawings wherein.

Figure 1:
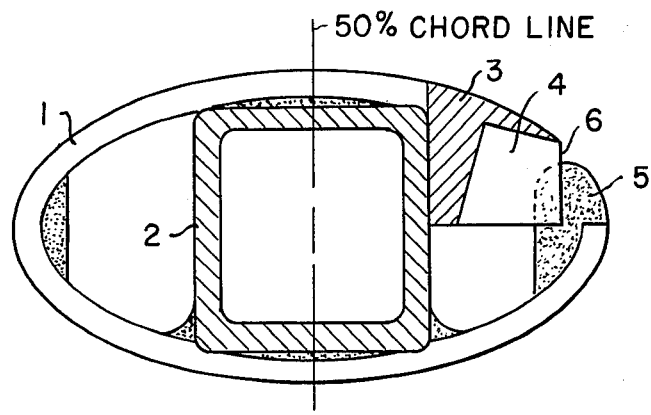
FIG. 1 is a cross section of a circulation control airfoil of the present invention taken at the root.
Figure 2:
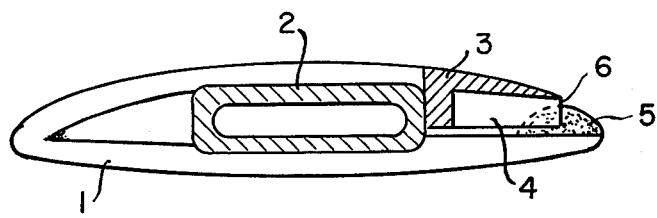
FIG. 2 is a side view of the circulation control airfoil taken at the tip section.

The five basic parts of this invention are illustrated in FIGS. 1 and 2. They are the skin 1, the spar 2, the slot blade 3, the supporting rib 4, and the Coanda trailing edge 5. All of these parts may be made from any suitable material, by any process as long as they meet the structural requirements of the airfoil. The three dimensional characteristics of the individual parts are described below.

The skin 1 of the airfoil must maintain the external geometry of the airfoil under all loading conditions. It may vary in thickness and be of one material or a composite. It is primarily for maintenance of the external geometry and must, therefore, be properly attached to the primary structural member, the spar. Alternatively, the spar 2 and skin 1 may be formed as a homogeneous piece instead of as separate pieces and/or the skin may be a partial load carrying member.

Figure 5:
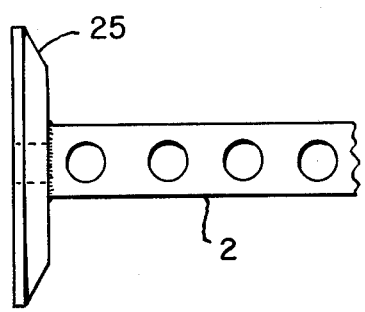
FIG. 5 is a cross section of the spar and the root end attachment means of the present invention.
Figure 4:
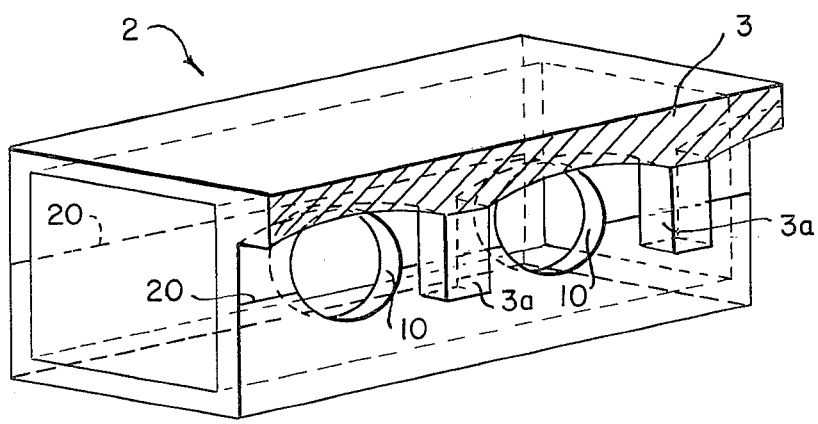
FIG. 4 is a perspective view of the spar design for the circulation control airfoil of the present invention.

The spar may be of any cross section as long as it meets the necessary stiffness and strength characteristics. It should be shaped such that a plenum is formed longitudinally along the airfoil whether it is internal to the spar or in conjunction with the skin 1 or the slot blade 3. The cross section of the spar may vary longitudinally along the airfoil to optimize strength to weight requirements. FIG. 1 illustrates a typical cross section of the spar at the root section of the airfoil and FIG. 2 illustrates a typical cross section of the spar at the tip section of the airfoil. Since the spar is the primary load carrying member of the structure, it must also be made so that it is easy to attach the remaining parts of the structure to it. In FIG. 4 a rectangular box spar according to the present invention is shown in detail. Holes or slots 10 may be drilled or otherwise formed in the box between portions 3a of slot blade 3 to allow the air to pass from the inside of the box to the area where the jet nozzle is located. They may be formed in either or both the leading edge or the trailing edge of the airfoil. The box may be split by providing a non-structural seal down the middle to isolate the leading edge from the trailing edge if blowing is required for both. The holes or slots may be judiciously placed to provide the best possible path to the jet nozzle 6. They can also be used to provide for thorough mixing of the air prior to reaching the nozzle, thus preventing possible laminar separation problems in the nozzle. The dynamic characteristics of the spar can also be tuned by proper size and placement of the slots or holes. The box spar may be tapered in height, width, or wall thickness. In the FIG. 4 embodiment of the present invention the spar is illustrated as comprising 2 U-channels welded together at juncture 20. The U-channels could similarly be bonded, clamped or mechanically attached. The U-channels may be tapered in height to accomodate changes in airfoil thickness-to-chord ratio taper requirements. The wall thickness change may be accomplished by machining or forming a plurality of the individual boxes shown in FIG. 4 with each individual box having a varying wall thickness and by attaching two or more boxes end-to-end. The boxes may be welded, bonded, clamped or mechanically locked together in any manner. The welds may be strengthened by providing overlaying tabs at the end of each box (not shown). The spar may be mechanically attached, welded, bonded, or integrally part of a root end attachment such as the root plate flange 25 shown in FIG. 5. This attachment transmits the loads carried by the spar to the body utilizing circulation control as a means for lift generation. The root attachment is designed to allow the pressurized air to enter the box spar via a hole or the like in the root plate flange 25.

The slot blade 3 is necessary to form the upper surface of the jet nozzle 6 and also maintain the external geometry of the trailing edge upper surface. It may be of one material or composite, but it must taper towards the nozzle to a relatively sharp point. Thus it requires a material with good stiffness characteristics. It may change shape longitudinally as required to maintain the external geometry, a good jet ejection angle, and its attachment to the spar and the rib 4 supporting it from below.

The rib 4 supports the slot blade 3, closes the trailing edge to improve torsional rigidity, and maintains the proper height of the jet exit slot. It is primarily attached to the slot blade and the trailing edge at either the Coanda surface 5 or the skin 1. It may also be attached to the spar. It may be an integral part of any of the other parts of the structure, e.g., the slot blade 3, but it will not be a continuous piece longitudinally. Several ribs will be placed judiciously at various longitudinal positions as required. This enables torsional characteristics to be improved and also allows space for the air to flow from the plenum to the slot exit 6.

The Coanda trailing edge has been illustrated as a separate part because of its significance. If the manufacturing process allows, the Coanda trailing edge 5 may be made as an integral part of the skin 1. It must, however, properly form the lower surface of the jet exit nozzle 6 and accept the rib 4 if the rib is to be embedded in it (as opposed to the rib being embedded in the lower skin).

Figure 3:
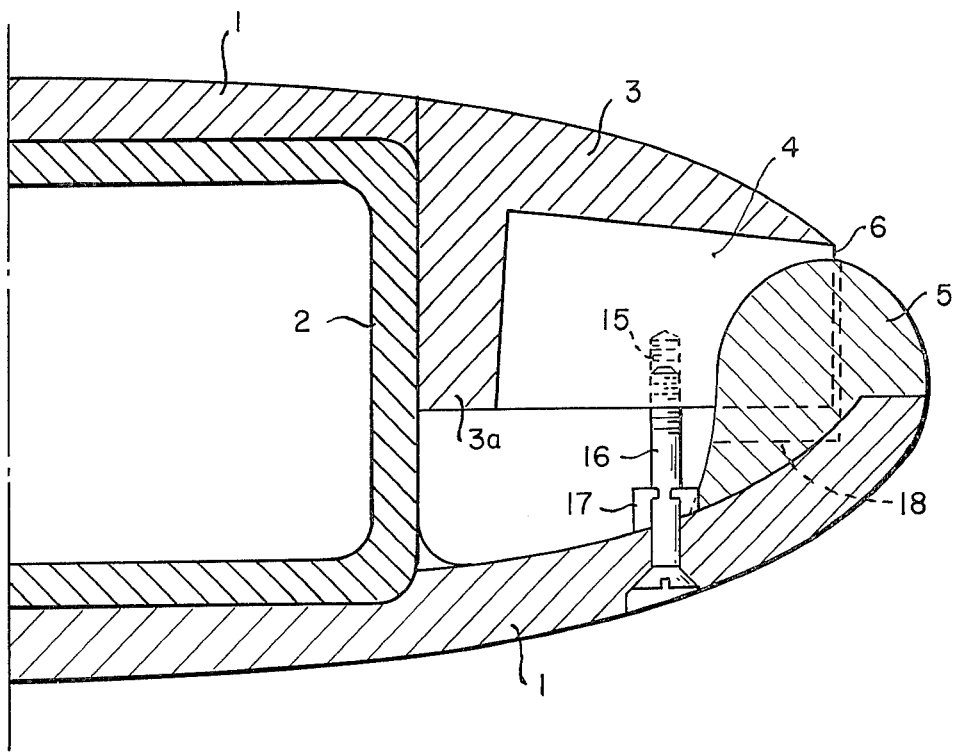
FIG. 3 is a cross section of the airfoil of the present invention showing a slot height adjustment means.

A slot 6 adjustment means may be provided as shown in FIG. 3. A hole 15 in rib 4 is threaded to receive screw 16. Screw 16 is held in place in the lower skin by the fastener 17 and upon rotation adjusts the position of the trailing edges with respect to the slot blade 3. This adjustability requires a slot 18 in which rib 4 slides. A change in slot height is caused by the movement of the lower skin and trailing edge in relation to the slot blade and the rib which are rigidly attached to the spar 2.

The structure of the present invention constitutes an airfoil which utilizes circulation control as a means of augmenting lift. The design of this structure allows a large portion of the cross-section to be used for ducting air longitudinally thus keeping internal duct velocities low. The external geometry can be maintained while a slot at the trailing edge permits a jet of air to be ejected along the external surface. The height of the slot can be maintained at discrete longitudinal positions while the torsional rigidity is also improved. The novel design concept, moreover, of locating the main structural spar and, thus, the airfoil center of gravity near the 50% chord line of the airfoil results in minimization of pitching moments occurring in symmetrically shaped airfoils.

Conventional "C" and "D" shaped spar construction designs cannot accommodate the necessity of having a symmetrical external geometry with an open surface and still maintain structural characteristics. A conventional spar, with openings allowing air to pass down it longitudinally and out through it to the trailing edge, needs an elaborate network of support ribs, etc., to reinforce it enough to provide proper bending and torsional strength. The novel box spar and rib structure support of the present invention provides a simple, light, and economical design for circulation control airfoils and also provides the necessary air passages while maintaining bending and torsional strength.

Obviously, many other modifications and variations of the present invention are possible in the light of the above teachings. It is, therefore, to be understood that within the scope of the appended claims the invention may be practiced otherwise than as specifically described.

What is claimed is:
1. A circulation control airfoil comprising:
   a longitudinal spar tapered in height, width, and wall thickness along its length to attain a tuned stiffness;
   a blunt airfoil leading edge attached to said spar;
   a blunt airfoil trailing edge attached to said spar;
   a slot blade attached to said spar such that slot blade forms a smooth junction with one of said blunt airfoil edges;
   one of said blunt airfoil edges further including a Coanda surface for receiving circulation control blowing;
   said Coanda surface and said slot blade forming a blowing slot for said circulation control blowing;
   said spar forming a plenum passage for supplying blowing fluid to said blowing slot and having a plurality of holes and slots along its length of such size and placement to attain a tuned stiffness and a controlled quantity of fluid to said blowing slot;
   at least a part of said longitudinal spar located at the 50% chord location of said airfoil; and
   a rib support structure attached to said slot blade and to a portion of said one of said blunt airfoil edges whereby said rib support maintains the geometric rigidity of said one of said blunt airfoil edges, said rib support structure including adjustment means for adjusting the height of said blowing slot.

* * * * *